United States Patent [19]
Naoumidis

[11] Patent Number: 5,470,672
[45] Date of Patent: Nov. 28, 1995

[54] FUEL CELLS AND PROCESS FOR THE PRODUCTION OF THE ANODE

[75] Inventor: Aristides Naoumidis, Jülich, Germany

[73] Assignee: Forschungszentrum Julich GmbH, Jülich, Germany

[21] Appl. No.: 344,956

[22] Filed: Nov. 25, 1994

[30] Foreign Application Priority Data

Nov. 27, 1993 [DE] Germany .......... 43 40 486.3

[51] Int. Cl.$^6$ .................. H01M 4/86
[52] U.S. Cl. .............. 429/40; 429/30; 429/46
[58] Field of Search .............. 429/30, 40, 46; 204/291; 501/87

[56] References Cited

U.S. PATENT DOCUMENTS

| | | | |
|---|---|---|---|
| 3,481,787 | 12/1969 | Adlhart | 429/40 |
| 3,502,506 | 3/1970 | Broyde | 429/40 |
| 3,737,344 | 6/1973 | Benda et al. | 429/40 |
| 3,977,901 | 8/1976 | Buzzelli | 429/40 |
| 4,341,965 | 7/1982 | Okuo et al. | 252/504 |
| 4,511,636 | 4/1985 | Vogel et al. | 429/46 |
| 4,937,152 | 6/1990 | Sato et al. | 429/30 |
| 5,209,989 | 5/1993 | Ishihara et al. | 429/30 |
| 5,306,579 | 4/1994 | Shepard, Jr. et al. | 429/40 |
| 5,354,627 | 10/1994 | Hatoh et al. | 429/40 |

*Primary Examiner*—John Niebling
*Assistant Examiner*—Bruce F. Bell
*Attorney, Agent, or Firm*—Frishauf, Holtz, Goodman, Langer & Chick

[57] ABSTRACT

A fuel cell with a solid oxide (SOFC) or a molten carbonate salt electrolyte (MCFC). The anode of the fuel cell, according to the invention, is a CERMET anode which consists of a solid mixture of tungsten carbide and an ion-conducting oxide, such as yttrium-fully stabilized zirconium oxide (YSZ). The fuel cell anode is prepared by a process whereby in order to form the solid mixture of which the anode is formed, a mixture of anion-conducting oxide powder and WC/WC(O), $WO_3$ or precursor thereof is prepared, and this mixture is converted into a YSZ-WC mixture in a $CO/CO_2$ atmosphere in a temperature range of 600°–1000° C.

17 Claims, 1 Drawing Sheet

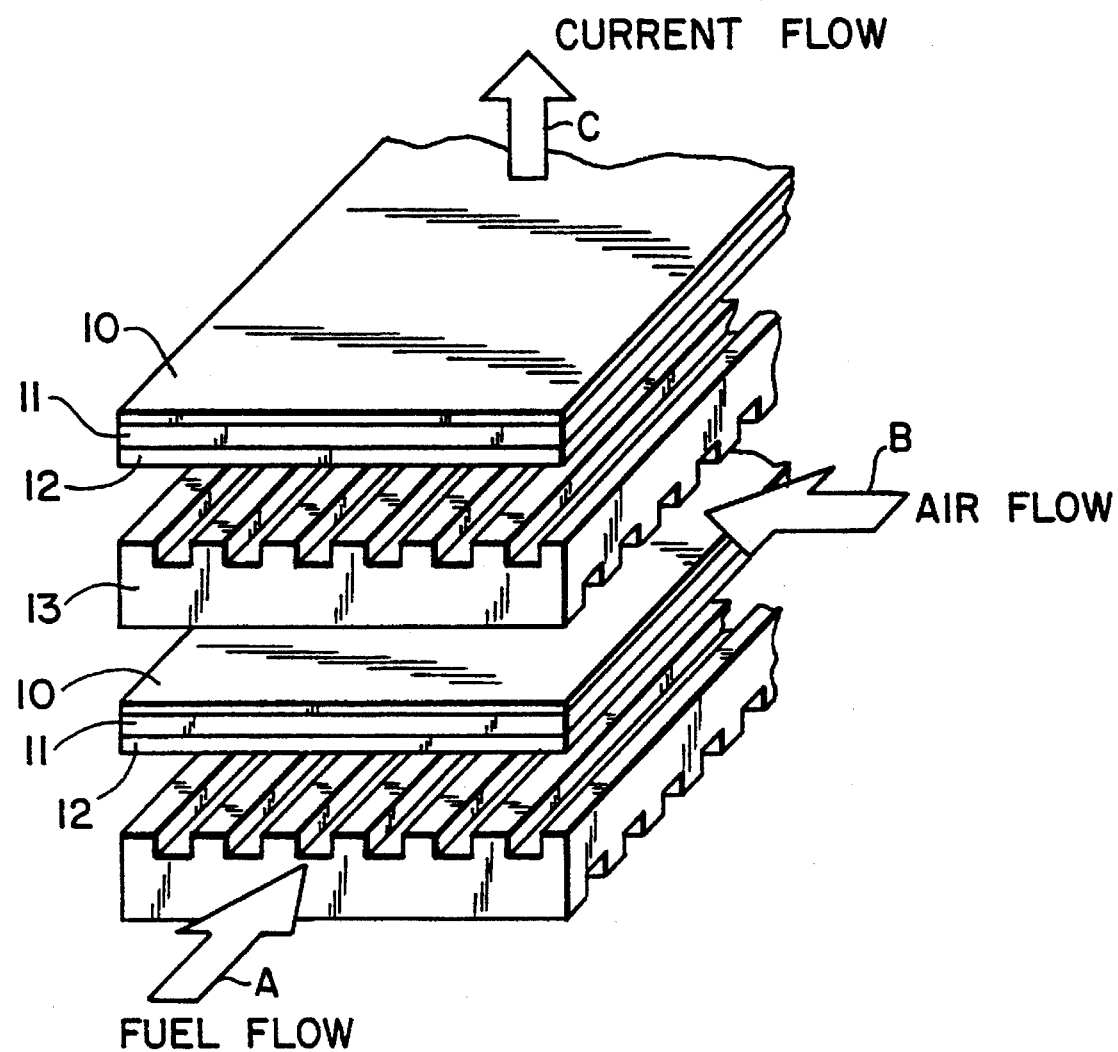

FUEL CELLS AND PROCESS FOR THE PRODUCTION OF THE ANODE

BACKGROUND OF THE INVENTION

The invention relates to a fuel cell with a solid oxide (SOFC)—or a molten carbonate salt electrolyte (MCFC), (SOFC=solid oxide fuel cell; MCFC=molten carbonate fuel cell). It further refers to a process for the production of an anode for the fuel cell.

Fuel cells are the subject of study because of their high energy conversion efficiency. They operate by converting chemical energy of fuels directly to electrical energy without the need for a thermal energy conversion step. This efficiency (not subject to the Carnot cycle limitations) coupled with (i) advantageous operating characteristics even at partial load, (ii) the possibility of co-generation of energy and (iii) production of low pollutants, makes the fuel cell a potentially important energy conversion device.

The present invention relates more specifically to a fuel cell of the type which is a ceramic fuel cell. As is usual with fuel cells, the device produces electricity by electrochemically combining fuel and oxidant gases across a separator. Ceramic fuel cells use an ionic conducting oxide and usually use an oxygen-ion conductor or a proton conductor as the electrolyte. The ceramic construction allows operation at high temperatures (greater than 600° C.).

A high-temperature fuel cell with a solid [oxide] electrolyte (SOFC) requires high reliability of all operating parts over an adequate time span during operation. In order to achieve this, at the present time systems of different sizes are being tested worldwide. In general, so-called classical materials are used with various modifications.

These materials include:

Zirconium oxide fully stabilized with yttrium (8 mol. %) (YSZ) as the electrolyte;

Perovskite ($LaMnO_3$) doped with strontium for lanthanum, and with cobalt for manganum, as the air electrode (cathode), CERMET of a mixture of metallic nickel and YSZ, as the fuel electrode (anode), A metal (Cr-base alloy) or ceramic (doped perovskite of lanthanum chromite) plate as an interconnector (bipole plate) to connect together cells into a stack.

One of the serious problems of this system lies in the fuel cell anode. Due to the thermodynamic instability of the interface between metal and ceramic, the nickel metal of the anode tends toward restructuring with a resultant loss of electrochemical activity and a breakdown of the electrical conductivity of the electrode. This effect is particularly great in the case of contamination of nickel with impurities, such as, e.g., sulfur or sulfur compounds present in gaseous fuels obtained by the gasification of various carbon products.

In addition, the nickel metal exhibits too high a catalytic activity for the internal reforming of a methane-water vapor mixture, whereby the electrode can be poisoned by the deposition of carbon at the three-phase boundary. Proposals to reduce the high catalytic effect in reforming by a partial or complete replacement of Ni by Pd or Co are currently being tested. However, the problems of the instability of the interface in CERMET cannot be resolved with these systems.

It is therefore an object of the invention to provide a fuel cell, including an anode, which avoids the problems of the art.

BRIEF DESCRIPTION OF THE INVENTION

The invention provides a fuel cell with a solid oxide (SOFC) or a molten carbonate salt electrolyte (MCFC). The anode of the fuel cell, according to the invention, is a solid mixture of tungsten carbide and an ion-conducting oxide, such as yttrium-fully stabilized zirconium oxide (YSZ).

The invention also concerns a process for the production of an anode of the solid mixture of tungsten carbide and an ion-conducting oxide, such as yttrium-fully stabilized zirconium oxide (YSZ). The inventive process requires that to form the solid mixture, a mixture of YSZ powder and $WO_3$ is prepared, and this mixture is converted into a YSZ-WC mixture in a $CO/CO_2$ atmosphere at a temperature range of 600°–1000° C.

BRIEF DESCRIPTION OF THE DRAWING

The figure shows an embodiment of a fuel cell including an anode of the present invention.

DETAILED DESCRIPTION OF THE INVENTION

The solution to these problems according to the invention comprises a ceramic fuel cell of the type generally described above and known in the art using a solid oxide or molten carbonate salt electrolyte. However, the fuel cell has an anode according to the present invention, which consists of a solid mixture of tungsten carbide and an ion-conducting oxide, such as yttrium-fully stabilized zirconium oxide (YSZ). Therefore, as compared with the prior art CERMET anode, the anode of the present invention has the metallic nickel of the prior art replaced with tungsten carbide. This anode thereby avoids all previously observed disadvantages of a CERMET anode.

The solid mixture of the anode appropriately consists of about 30–80 vol. %, preferably 30–70 vol. % and more preferably 40–60 vol. % tungsten carbide. The ion-conducting oxide is preferably YSZ.

Referring to the figure, an improved ceramic fuel cell according to the present invention comprises a sandwich structure having a cathode 10, and an anode 12 separated by the solid electrolyte 11.

The figure shows a stack of cells separated by a bipolar plate 13. As a practical matter stacking the cells provides a greater output with convenience of construction. It is possible to connect the cells in other ways although this is most practical to allow the fuel flow shown by arrow A over the anode 12 side of the cell and the air flow (oxidizer) shown by arrow B over the cathode 10 side of the cell.

The anode 12 of the present invention replaces the known CERMET anodes in ceramic fuel cells. Usual cathodes such as described above and SOFC and MCFC electrolytes also described above, can be used.

In the inventive cell, YSZ electrolyte can be used. Another electrolyte, $SrCe(Yb)O_3$ electrolyte for example (wherein 3 to 5% of the Ce is replaced with Yb), can be used in place of the YSZ electrolyte.

When forming a cell with a solid electrolyte, it is preferred but not necessary that the solid electrolyte forms the substrate on which the anode and cathode are formed.

Forming the Anode

In the process of the invention for the production of the anode a solid mixture is formed which is a mixture of YSZ powder and $WO_3$, or another tungsten compound, which other tungsten is a precursor for $WO_3$ which, when subjected to thermal decomposition, forms $WO_3$. This mixture is sintered adhesively with the electrolyte to form a layer on the electrolyte and finally converted to a YSZ-WC mixture in a $CO/CO_2$ atmosphere in the temperature range of 600°–1000° C. Examples of the other tungsten compounds that convert to $WO_3$ and therefore can be used in the mixture include tungstic acid and ammonium tungstate. It is also possible to start with a mixture of WC and YSZ, and proceed by these steps including heating in the $CO/CO_2$ atmosphere as a preferable step to ensure maximum activity as an anode.

More specifically, to form the anode, $WO_3$, a powder or a precursor powder mixture for $WO_3$ as noted above, is mixed with YSZ powder and applied to the solid electrolyte (e.g. YSZ electrolyte films). It is also suitable to start with WC (usually containing some oxygen WC(O)) to mix with the YSZ powder. The mixture can be conveniently applied to the electrolyte by forming a screen printing paste with a screen printing binder (e.g. cellulose), which is then coated in a layer onto the electrolyte. However, the film thickness applied on the electrolyte to form the anode is normally in the range of 20–50 μm.

The resulting composite is calcined at about 700° C. in air and carburized in a mixture of $CO/CO_2$ at about 770° C. to form the anode as part of a half-cell.

When WC powder is used, the carburization step is optional as the WC powder is already formed; however, it is highly desirable as the carburization step ensures that the high activity for the anode is maintained by converting any other W compound present into WC.

The WC/WC(O) powder for use in forming the anode can be preferably formed by spray drying an $(NH_4)_2WO_4$ (solution) or $H_2WO_4$ (gel) to form a powder containing $WO_3$. The powder is calcined at approximately 700° C. and then reduced to $WO_2$ in hydrogen (4% vol. $H_2$ in argon) at approximately 400° C. The $WO_2$ powder is then carburized to WC/WC(O) powder in a 9:1 mixture of $CO:CO_2$ at approximately 770° C.

The resulting powder can then be mixed with YSZ powder and applied to the solid electrolyte as described above.

In the procedure wherein a precursor of the $WO_3$ is used, the precursor (e.g. $(NH_4)_4WO_4$ (powder) or $H_2WO_4$ (powder)) is formed into a screen printing paste by mixing with a suitable binder, and mixing with YSZ powder, this is then screen printed or otherwise applied to the solid electrolyte, and the resulting "sandwich" or composite structure is calcined and carburized whereby the anode (as part of a half-cell) is formed as discussed in detail above.

Examples

For testing, tungsten carbide mixed with YSZ in various amounts was screen printed onto the surface of the electrolyte as described above, on the anode side of an SOFC. Mixtures containing 30, 40, 50, 60 and 70 vol. % tungsten carbide in YSZ were formed into anodes for testing.

Electrochemical tests to determine the polarization voltage of this half cell show that this system has a behavior similar to that of a platinum electrode. Also no large variations in electrical conductivity were measured among the samples.

Investigations to determine the long-term stability of this system have resulted in the conclusion that after storage of the solid mixture in an $H_2$ atmosphere for more than 1000 hours at 1100° C., optical metallography and scanning electron microscopic observation and measurement of the electrochemical activity determined that no change occurred in the structure, i.e., there is no agglomeration of one or the other phase. A somewhat shorter test over 350 hours with such a mixture at 1000° C. in a $H_2S$-containing hydrogen atmosphere also led to the conclusion that there was no determinable change in structure.

The spray drying method described above and which involves calcining and carbonization of precursors of the powder mixture for forming the anode, to convert them into the tungsten carbide solid mixture, has been found to lead to a favorable powder morphology and is therefore preferred, even though it necessarily involves the decomposition of the precursor compounds such as ammonium tungstate or gel of tungstic acid.

The above is by way of embodiments of the invention but is not considered limitative of the scope of the invention which is defined by the following claims.

What is claimed is:

1. In an anode for a fuel cell with a solid oxide (SOFC) or a molten carbonate salt electrolyte (MCFC), the improvement wherein said anode consists essentially of a solid mixture of tungsten carbide and an ion-conducting oxide.

2. The anode of claim 1, wherein said ion-conducting oxide is yttrium fully-stabilized zirconium oxide (YSZ).

3. The anode according to claim 2, wherein the solid mixture contains approximately 30–80 vol. % of the tungsten carbide.

4. The anode according to claim 2, wherein the solid mixture contains approximately 30–70 vol. % of the tungsten carbide.

5. The anode according to claim 2, wherein the solid mixture contains approximately 40–60 vol. % of the tungsten carbide.

6. The anode according to claim 2, wherein the solid mixture contains approximately 50 vol. % of the tungsten carbide.

7. The anode according to claim 1, wherein the solid mixture contains approximately 30–80 vol. % of the tungsten carbide.

8. The anode according to claim 1, wherein the solid mixture contains approximately 30–70 vol. % of the tungsten carbide.

9. The anode according to claim 1, wherein the solid mixture contains approximately 40–60 vol. % of the tungsten carbide.

10. The anode according to claim 1, wherein the solid mixture contains approximately 50 vol. % of the tungsten carbide.

11. In a fuel cell with a solid oxide (SOFC) or a molten salt carbonate electrolyte (MCFC), the improvement comprising an anode for the fuel cell which anode consists essentially of a solid mixture of tungsten carbide and an ion-conducting oxide.

12. The fuel cell according to claim 11, wherein the solid mixture of the anode consists of 30–80 vol. % tungsten carbide.

13. The fuel cell of claim 12, wherein said ion-conducting oxide is yttrium fully-stabilized zirconium oxide (YSZ).

14. The fuel cell according to claim 13, wherein the solid mixture contains approximately 30–70 vol. % of the tungsten carbide.

15. The fuel cell according to claim 13, wherein the solid mixture contains approximately 40–60 vol. % of the tungsten carbide.

16. The fuel cell according to claim 13, wherein the solid mixture contains approximately 50 vol. % of the tungsten carbide.

17. The fuel cell according to claim 12, wherein the solid mixture contains approximately 30–70 vol. % of the tungsten carbide.

* * * * *